(12) United States Patent
Rai (10) Patent No.: US 8,134,743 B2
(45) Date of Patent: Mar. 13, 2012

(54) METHODS AND SYSTEMS FOR ROUTING AND PROCESSING JOBS IN A PRODUCTION ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1265 days.

(21) Appl. No.: 11/779,454

(22) Filed: Jul. 18, 2007

(65) Prior Publication Data

US 2009/0021774 A1   Jan. 22, 2009

(51) Int. Cl.
*G06F 15/00* (2006.01)
*G06F 3/12* (2006.01)
*G06F 9/46* (2006.01)
*G06Q 10/00* (2006.01)

(52) U.S. Cl. ...... 358/1.9; 358/1.15; 358/1.13; 705/7.12; 705/7.23; 718/101; 718/104; 718/105

(58) Field of Classification Search ............... 358/1.9, 358/1.15, 2.1, 400, 500, 437, 468, 1.13; 705/7.12, 705/7.23, 7.25, 7.27; 718/102–107
See application file for complete search history.

(56) References Cited

U.S. PATENT DOCUMENTS

| | | | |
|---|---|---|---|
| 5,095,369 A | 3/1992 | Ortiz et al. |
| 5,513,126 A | 4/1996 | Harkins et al. |
| 5,559,933 A | 9/1996 | Boswell |
| 6,223,205 B1 | 4/2001 | Harchol-Balter et al. |
| 6,509,974 B1 | 1/2003 | Hansen |
| 6,573,910 B1 | 6/2003 | Duke et al. |
| 6,631,305 B2 | 10/2003 | Newmark |
| 6,633,821 B2 | 10/2003 | Jackson et al. |
| 6,762,851 B1 | 7/2004 | Lynch et al. |
| 6,805,502 B2 | 10/2004 | Rai et al. |
| 6,925,431 B1 | 8/2005 | Papaefstathiou |
| 6,961,732 B2 | 11/2005 | Hellemann et al. |
| 6,993,400 B2 | 1/2006 | Viassolo |
| 7,016,061 B1 | 3/2006 | Hewitt |
| 7,051,328 B2 | 5/2006 | Rai et al. |
| 7,061,636 B2 | 6/2006 | Ryan et al. |
| 7,065,567 B1 | 6/2006 | Squires et al. |
| 7,079,266 B1 | 7/2006 | Rai et al. |
| 7,092,922 B2 | 8/2006 | Meng et al. |

(Continued)

FOREIGN PATENT DOCUMENTS

CA   2503427 A1   10/2005

(Continued)

OTHER PUBLICATIONS

Harchol-Balter, et al., "On Choosing a Task Assignment Policy for a Distributed Server System," IEEE Journal of Parallel and Distributed Computing, 1999, pp. 204-228.

(Continued)

*Primary Examiner* — Thomas Lett
(74) *Attorney, Agent, or Firm* — Pepper Hamilton LLP (57) ABSTRACT

A system and method for routing and processing jobs in a production environment considers the setup characteristics of each print job. Each set of jobs may be classified as a first job processing speed set, a second job processing speed set, or another job processing speed set based on the corresponding setup characteristics. First job processing speed sets are routed to a first group of job processing resources, while second job processing speed sets are routed to a second group of job processing speed resources. Each resource group may include an autonomous cell.

10 Claims, 5 Drawing Sheets

U.S. PATENT DOCUMENTS

| | | | |
|---|---|---|---|
| 7,092,963 B2 | 8/2006 | Ryan et al. | |
| 7,099,037 B2 | 8/2006 | Clark et al. | |
| 7,125,179 B1 | 10/2006 | Rai et al. | |
| 7,148,985 B2 | 12/2006 | Christodoulou et al. | |
| 7,152,589 B2 | 12/2006 | Ekeroth et al. | |
| 7,161,699 B2 | 1/2007 | Matoba | |
| 7,200,505 B2 | 4/2007 | Shan | |
| 7,206,087 B2 | 4/2007 | Ryan et al. | |
| 7,382,484 B2 | 6/2008 | Matsukubo et al. | |
| 7,523,048 B1 | 4/2009 | Dvorak | |
| 7,548,335 B2 | 6/2009 | Lawrence et al. | |
| 7,562,062 B2 | 7/2009 | Ladde et al. | |
| 7,576,874 B2 | 8/2009 | Farrell et al. | |
| 7,584,116 B2 | 9/2009 | Kakouros et al. | |
| 7,590,937 B2 | 9/2009 | Jacobus et al. | |
| 7,689,694 B2 | 3/2010 | Kato et al. | |
| 7,761,336 B1 | 7/2010 | Blankenship et al. | |
| 7,949,740 B2 | 5/2011 | Scrafford et al. | |
| 2001/0055123 A1 | 12/2001 | Ryan et al. | |
| 2002/0016803 A1 | 2/2002 | Ryan et al. | |
| 2002/0054344 A1* | 5/2002 | Tateyama | 358/1.15 |
| 2002/0071134 A1 | 6/2002 | Jackson et al. | |
| 2002/0129081 A1* | 9/2002 | Rai et al. | 709/102 |
| 2002/0198794 A1 | 12/2002 | Williams et al. | |
| 2003/0079160 A1 | 4/2003 | McGee et al. | |
| 2003/0098991 A1 | 5/2003 | Laverty et al. | |
| 2003/0105661 A1 | 6/2003 | Matsuzaki et al. | |
| 2003/0121431 A1 | 7/2003 | Ohno | |
| 2003/0149747 A1 | 8/2003 | Rai et al. | |
| 2003/0200252 A1 | 10/2003 | Krum | |
| 2003/0202204 A1 | 10/2003 | Terrill et al. | |
| 2004/0135838 A1 | 7/2004 | Owen et al. | |
| 2004/0136025 A1 | 7/2004 | Moriyama et al. | |
| 2004/0239992 A1 | 12/2004 | Kawai | |
| 2004/0268349 A1 | 12/2004 | Ramakrishnan et al. | |
| 2005/0060650 A1 | 3/2005 | Ryan et al. | |
| 2005/0065830 A1 | 3/2005 | Duke et al. | |
| 2005/0068562 A1 | 3/2005 | Ferlitsch | |
| 2005/0096770 A1* | 5/2005 | Chua et al. | 700/102 |
| 2005/0114829 A1* | 5/2005 | Robin et al. | 717/101 |
| 2005/0134886 A1 | 6/2005 | Farrell et al. | |
| 2005/0151993 A1 | 7/2005 | Gartstein et al. | |
| 2005/0154625 A1 | 7/2005 | Chua et al. | |
| 2005/0275875 A1 | 12/2005 | Jennings | |
| 2006/0031585 A1 | 2/2006 | Nielsen et al. | |
| 2006/0132512 A1 | 6/2006 | Walmsley et al. | |
| 2006/0149755 A1 | 7/2006 | Marshall et al. | |
| 2006/0224440 A1 | 10/2006 | Rai | |
| 2006/0226980 A1 | 10/2006 | Rai et al. | |
| 2007/0008580 A1 | 1/2007 | Tanaka | |
| 2007/0019228 A1 | 1/2007 | Rai et al. | |
| 2007/0070379 A1 | 3/2007 | Rai et al. | |
| 2007/0078585 A1 | 4/2007 | Pomeroy et al. | |
| 2007/0091355 A1 | 4/2007 | Rai | |
| 2007/0092323 A1 | 4/2007 | Lin et al. | |
| 2007/0124182 A1 | 5/2007 | Rai | |
| 2007/0177191 A1 | 8/2007 | Eschbach et al. | |
| 2007/0236724 A1 | 10/2007 | Rai et al. | |
| 2007/0247657 A1 | 10/2007 | Zhang et al. | |
| 2007/0247659 A1 | 10/2007 | Zhang et al. | |
| 2007/0279675 A1 | 12/2007 | Quach et al. | |
| 2007/0293981 A1 | 12/2007 | Rai | |
| 2008/0013109 A1 | 1/2008 | Chen et al. | |
| 2008/0201182 A1 | 8/2008 | Schneider et al. | |
| 2008/0239368 A1 | 10/2008 | Ota | |
| 2008/0256541 A1 | 10/2008 | Rai | |
| 2009/0094094 A1 | 4/2009 | Rai et al. | |
| 2009/0313061 A1 | 12/2009 | Rai et al. | |
| 2009/0313063 A1 | 12/2009 | Rai | |
| 2009/0327033 A1 | 12/2009 | Rai et al. | |

FOREIGN PATENT DOCUMENTS

| | | |
|---|---|---|
| EP | 1630663 A2 | 1/2006 |
| EP | 1705556 A1 | 9/2006 |

OTHER PUBLICATIONS

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the 42$^{nd}$ IEEE Conference on Decision and Control, Maui, Hawaii, Dec. 2003.

Zheng et al., "Finding Optimal (s,S) Policies Is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al.; "Computing Optimal (s,S) Inventory Policies", Management Science, vol. 11, No. 5, Series A., Sciences, Mar. 1965, pp. 525-552.

Simchi Levi, et al. "Designing & Managing the Supply Chain: Concepts, Strategies and Cases", Second Edition.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models", Chapman & Hall/CRC, 2005 (This is a book).

* cited by examiner

FIG. 1

|  | 205 | 210 |
|---|---|---|
| JOB | TRIM TYPE | EXTERIOR TYPE |
| J1 | A | 1 |
| J2 | B | 2 |
| J3 | A | 4 |
| J4 | C | 3 |
| J5 | C | 2 |

*FIG. 2*

| JOB | TRIM TYPE | EXTERIOR TYPE |
|---|---|---|
| J1 | A | 1 |
| J2 | A | 2 |
| J3 | B | 1 |
| J4 | A | 2 |
| J5 | A | 1 |

*FIG. 3*

| JOB | TRIM TYPE | EXTERIOR TYPE |
|---|---|---|
| J1 | A | 1 |
| J2 | B | 2 |
| J3 | C | 2 |
| J4 | D | 2 |
| J5 | B | 1 |

| JOB | TRIM TYPE | EXTERIOR TYPE |
|---|---|---|
| J1 | A | 1 |
| J2 | B | 3 |
| J3 | B | 2 |
| J4 | A | 1 |
| J5 | B | 3 |

METHODS AND SYSTEMS FOR ROUTING AND PROCESSING JOBS IN A PRODUCTION ENVIRONMENT

REFERENCE TO RELATED APPLICATIONS

This application is related to U.S. patent application Ser. Nos. 11/779,437, 11/779,392; 11/779,418; 11/779,464; 11/779,494; and 11/779,512, each filed Jul. 18, 2007, and 10/946,756 filed Sep. 22, 2004.

Not Applicable

BACKGROUND

The disclosed embodiments relate generally to a method and system for distributing jobs in a manufacturing or production process.

Manufacturing and production processes produce results by receiving sets of instructions and materials required to create or modify an item, such as a document, a vehicle, a computing device, or another item. Often the processes must permit some customization or alteration of individual items based on customer desires. For example, although an automobile production line may be configured to produce a particular make and model of car, the individual cars produced may have different specifications, such as leather or cloth seating, standard or premium wheels, exterior paint color, and other specifications of type. As another example, document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print jobs can be processed by performing one or more production functions.

Scheduling architectures that organize jobs in a production process and route the jobs to autonomous cells are known in the art and are described in, for example, U.S. Pat. No. 7,051, 328 to Rai et al. and U.S. Pat. No. 7,065,567 to Squires et al. the disclosures of which are incorporated by reference in their entirety.

Variation in these production requirements from job to job can cause significant processing delays even when resources have been allocated to balance the job flow. For example, jobs can have a number of different setup characteristics, and each setup characteristic may correspond to several different characteristic types. Significant setup delays can arise in processing jobs with variable setup characteristics in a production environment. Setup time can be particularly acute in production environments where substantial interruption in operation is unacceptable, such as environments that utilize continuous feed or processing equipment. Setup delays can significantly impact throughput.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for processing a set of jobs includes a set of one or more resources in a production environment and a computer-readable storage medium having programming instructions for performing a method of processing a set of jobs. The method includes providing a job set made up of one or more jobs, wherein each of the jobs has one or more corresponding setup characteristics. The method also includes storing the job set in a computer-readable storage medium, and identifying the job set as either a first job processing speed set or a second job processing speed set based on the corresponding setup characteristics. If the job set is a first job processing speed set, the method includes routing the job set to a first subset of the set of one or more resources, wherein the first subset includes one or more first resources for processing the job set. If the job set is a second job processing speed set, the method includes routing the job set to a second subset of the set of one or more resources, wherein the second subset includes one or more second resources for processing the job set. The first subset may include a first autonomous cell, and the second subset may include a second autonomous cell.

The system also may include a workflow management system operable to coordinate a distribution of jobs to the resources. Optionally, identifying the job set may include one or more programming instructions for identifying the one or more setup characteristics, wherein each corresponding setup characteristic includes one or more types. In a vehicle production environment, types may include trim types, exterior color types, or other feature types. In a computer production environment, types may include processor types, drive types, memory types, or other features. For each corresponding setup characteristic, the method may include determining the number of corresponding types associated with the job set. If, for each corresponding setup characteristic, the number of corresponding types associated with the job set does not exceed a threshold value associated with the corresponding setup characteristic, the method may determine that the job set is a first processing speed set. If the number of corresponding types of at least one setup characteristic associated with the job set exceeds the threshold value associated with the corresponding setup characteristic, then the method may determine that the job set is a second processing speed set.

Optionally, the system also may include one or more programming instructions for determining the threshold values using a simulation method, wherein the simulation method includes determining an optimal number of corresponding types for each corresponding setup characteristic. Determining an optimal number of corresponding types may include one or more programming instructions for determining an optimal number of corresponding types In an alternate embodiment, a system for processing a set of jobs includes a set of one or more resources in a production environment, a workflow management system operable to coordinate a distribution of jobs to the resources, and a computer-readable storage medium having programming instructions for performing a method of processing a set of jobs. The method may include providing a job set made of one or more jobs, wherein each of the jobs has one or more corresponding setup characteristics. The method also may include storing the job set in a computer-readable storage medium and identifying each job set as a first job processing speed set, a second job processing speed set or a third job processing speed set based on the one or more corresponding setup characteristics. If the job set is a first job processing speed set, the method may include routing the job set to a first subset of the set of one or more resources, wherein the first subset comprises one or more first resources for processing the job set. If the job set is a second job processing speed set, the method may include routing the job set to a second subset of the set of one or more resources, wherein the second subset comprises one or more second resources for processing the job set. If the job set is a job processing speed set, the method may include routing the job set to a third subset of the set of one or more resources, wherein the third subset comprises one or more third resources for processing the job set. Optionally, the first subset includes a first autonomous cell, the second subset includes a second autonomous cell and the third subset includes a third autonomous cell.

Optionally, identifying the job set includes one or more programming instructions for identifying the one or more corresponding setup characteristics, wherein each corresponding setup characteristic includes one or more types. In a vehicle production environment, types may include trim types, exterior color types, or other feature types. In a computer production environment, types may include processor types, drive types, memory types, or other features. For each corresponding setup characteristic, the method may include determining a number of corresponding types associated with the job set. It may determine that the set is a first processing speed set if, for each corresponding setup characteristic, the number of corresponding types does not exceed a first threshold value associated with the corresponding setup characteristic. It may determine that the job set is a second processing speed set if the number of corresponding types of at least one corresponding setup characteristic associated with the job set exceeds a second threshold value associated with the corresponding setup characteristic. It may determine that the job set is a third processing speed set if, for each corresponding setup characteristic, the number of corresponding types is greater than the first threshold value and less than the second threshold value. The system also may include programming instructions for determining the threshold values using a simulation method, wherein the simulation method determines an optimal number of corresponding types for each corresponding setup characteristic.

DETAILED DESCRIPTION

For purposes of the discussion below, a "production environment" or "production process" refers to an entity having multiple items of equipment to manufacture and/or process items that may be customized based on customer requirements. For example, a vehicle production environment may exist in an automobile assembly plant, where different areas exist to assemble and/or finish portions of the automobile such as the engine, trim, drive train, and other parts. A document production environment includes document production resources, such as printers, cutters, collators and the like. A chemical, pharmaceutical or other process industry production environment may include production resources such as chemical processing units, vessels, heating equipment, mixing equipment and the like. A production environment may be a freestanding entity, including one or more production-related devices, or it may be part of a corporation or other entity. Additionally, the production environment may communicate with one or more servers by way of a local area network or a wide area network, such as the Internet or the World Wide Web.

A "job" refers to a logical unit of work that is to be completed for a customer. A job may include one or more jobs to build, assemble or process a product. A production system may include a plurality of jobs.

Figure 1:
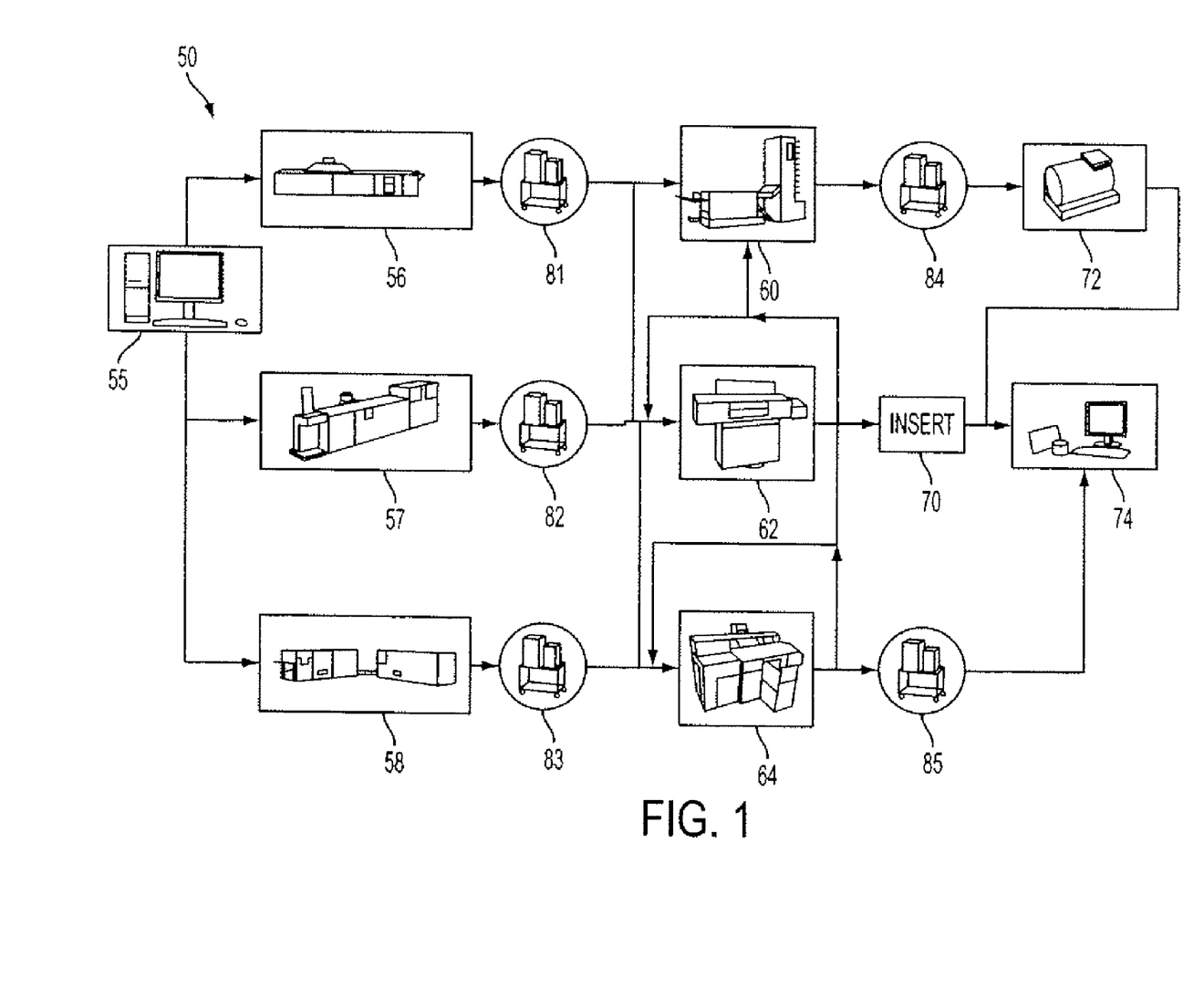
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Production environments may receive a wide variety of jobs from numerous clients. Partitioning jobs based on an attribute of the setup characteristics may improve processing efficiency in a production environment. In an embodiment, jobs received by a production environment may be sorted based on a setup characteristic attribute before being processed in order to better optimize the job flow. A setup characteristic may include a feature of any step in the production process. For example, in a document production system, the printer setup may be dependent on the type of form used. Alternatively, the insertion operation setup may depend on one or more inserts associated with each job. As yet another example, in a chemical production environment, setup characteristics may be associated with cleaning and preparing production resources to process a next chemical product type. For example, a setup characteristic may include the time required to clean a production resource before it can be used to process another chemical product.

In an embodiment, each setup characteristic may be associated with one or more types. For example, in a document production system, form type may be an example of a setup characteristic. A form type setup characteristic may be associated with three types of forms: form A, form B and form C. As such, in this example, form A, form B and form C may be the types associated with the form type setup characteristic. In an automobile production environment, setup characteristics may result from customer selections of trim design, exterior paint color, interior color, seating type, transmission type, engine size, audio equipment, security systems, remote start systems, other electronics options, and/or other features. In a computer system production environment, setup characteristics may result from customer selections of hard drive capacity, random access memory capacity, processing speed, video or graphics cards, storage drives, operating system, sound cards, installed software, and/or other features.

Figure 2:
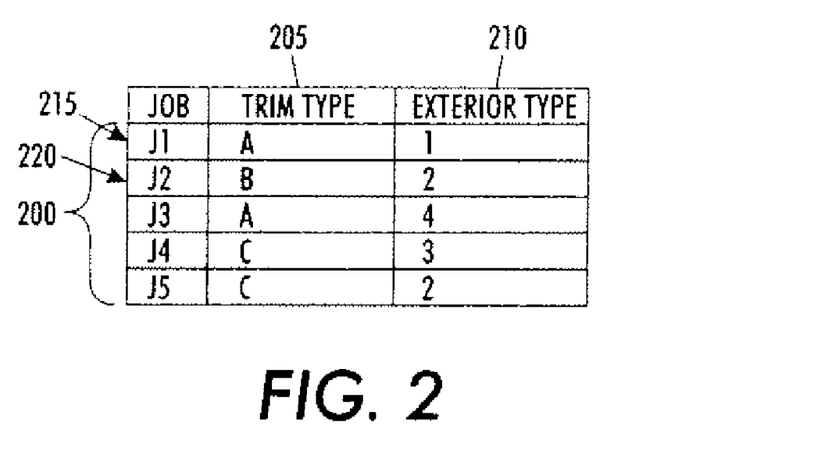
FIG. 2 depicts a set of jobs, setup characteristics and corresponding types according to an embodiment.

In an embodiment, a job stream may be categorized based on the number of types associated with each setup characteristic. For example, in a vehicle production environment, a set of jobs may be received. A set of jobs may include one or more jobs. In an embodiment, a set of jobs may include a one or more jobs which may have a common characteristic, such as jobs that will result in the same vehicle model. The set of print jobs may be associated with two setup characteristics, such as trim type and exterior color. As illustrated by FIG. 2, a set of jobs may include five jobs, jobs J1-J5 200 and each job may be associated with a trim type setup characteristic 205 and an exterior characteristic 210. For example, job J1 215 may be associated with trim type A and exterior color type 1, while job J2 220 may be associated with trim type B and exterior color type 2.

In an alternate embodiment, job sets may be categorized based on the average number of types associated with each setup characteristic over a specified interval. For example, a job set met have an average of two exterior color types per day.

In an embodiment, a threshold value may be determined for each setup characteristic. The threshold value may represent the number of types associated with each setup characteristic that may be necessary to optimize job flow. The threshold value may be determined using a simulation model, such as a model based on discrete event simulation, to simulate and optimize the workflow. A simulation-based approach may be used to determine an optimal number of types for each setup characteristic by using manual iteration until an improved solution is obtained. Alternatively, formal optimization techniques may be used. If formal optimization techniques are used, the threshold parameters may be specified as variables and a performance measure, such as the total number of late jobs, total production cost or the like, of the overall print shop may be used as an objective function to be optimized. Constraint functions may also be specified in addition to constraints on variables. Threshold parameters may then be determined via an optimization of the simulation model. Several techniques, such as mixed-integer programming, simulated annealing, genetic programs and the like can be used to perform the optimization that may include discrete and continuous decision variables.

In an embodiment, a set of jobs may be categorized based on a comparison between the number of types associated with each setup characteristic for the set of jobs and the threshold value for each setup characteristic. For example, if the threshold value associated with trim type is '2' and the threshold value associated with exterior color type is '3', a job set having two or fewer trim types and three or fewer exterior color types may be identified as a first job processing speed set, such as a fast job set or the like. A fast job set may include jobs that have low setup requirements when compared to the thresholds associated with the setup requirements. For example, a fast job set may include jobs with substantially similar setup requirements which may ease transitioning from one job to the next.

A set of jobs having more than two trim types and/or more than three exterior color types may be identified as a second job processing speed set, such as a slow job set or the like. A slow job set may include jobs that have high setup requirements when compared to the thresholds associated with the setup requirements. For example, a slow job set may include jobs with substantially different setup requirements which may cause significant delays in transitioning from one job to the next.

Figure 3:
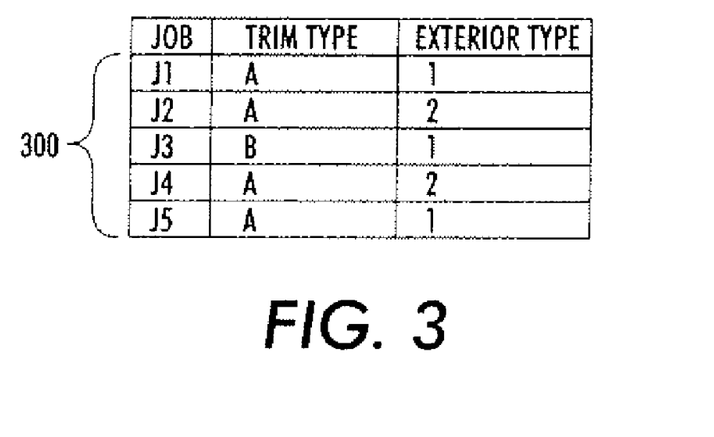
FIG. 3 depicts a fast job set according to an embodiment.

FIG. 3 illustrates categorizing a set of jobs 300, J1-J5, in this manner. As illustrated in FIG. 3, the set of jobs 300 utilizes two trim types (i.e., form type A and form type B) and two exterior color types (i.e., exterior color type 1 and exterior color type 2). Because the number of trim types associated with the set of jobs 300 equals the trim type threshold value (i.e., 2) and because the number of exterior color types associated with the set of jobs is less than the exterior color type threshold value (i.e., 3), the set of jobs 300 may be identified as a fast job set.

Figure 4:
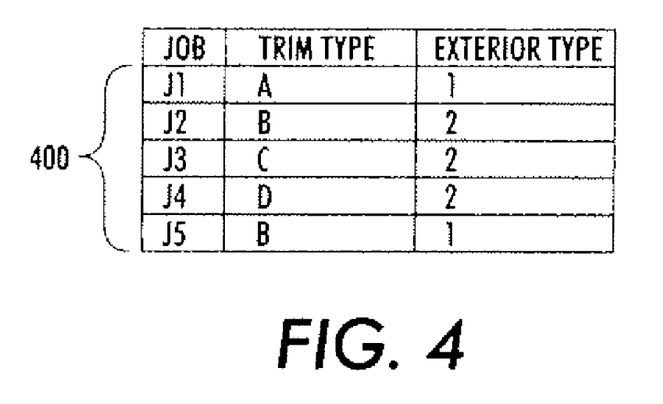
FIG. 4 depicts a slow job set according to an embodiment.

In comparison, as illustrated by FIG. 4, the set of jobs 400, J1-J5, utilizes four trim types (i.e., trim type A, trim type B, trim type C and trim form type D) and two exterior color types (i.e., insert type 1 and insert type 2). Even though the number of exterior color types associated with the set of jobs 400 (i.e., 2) is less than the threshold value associated with the exterior color type setup characteristic (i.e., 3), the set of jobs 400 may be identified as a slow job set because the number of trim types associated with the set of jobs 400 (i.e., 4) exceeds the threshold value associated with the trim type setup characteristic (i.e., 2).

In an alternate embodiment, a set of jobs may be grouped based on different threshold conditions. For example, a set of jobs may be identified as a fast job set if the number of types associated with one setup characteristic is less than the threshold value associated with that setup characteristic. For example, a set of jobs may be identified as a fast job set if the number of trim types associated with the jobs is less than or equal to the threshold value associated with the trim type characteristic. Referring back to FIG. 2, if the trim type threshold value is 4, then the set of jobs 200 may be identified as a fast job set because the set of jobs 200 utilizes three trim types which is less than the threshold value associated with the trim type characteristic.

Figure 5:
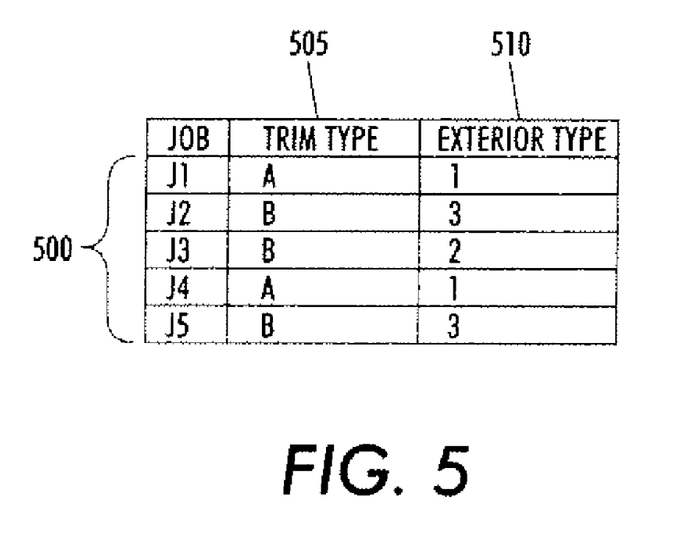
FIG. 5 depicts an intermediate job set according to an embodiment.

In another embodiment, sets of jobs may be identified according to a plurality of thresholds associated with the same setup characteristic. For example, a set of jobs having a number of types less than a first threshold value, but more than a second threshold value may be grouped in a third job processing speed set, such as an intermediate job set or the like. FIG. 5 illustrates a set of jobs 500, J1-J5, having a trim type setup characteristic 505 and an exterior color type setup characteristic 510. The first threshold value associated with the trim type setup characteristic may be '3', and the second threshold value associated with the trim type setup characteristic may be '1'. Similarly, the first setup characteristic associated with the exterior color type setup characteristic may be '4', and the second threshold value associated with the exterior color type setup characteristic may be '2'. The set of jobs 500 utilizes two trim types (i.e., trim type A and trim type B) which is between the first threshold value (i.e., 3) and the second threshold value (i.e., 1) associated with the trim type characteristic. The set of jobs also utilizes three exterior color types (i.e., exterior color type 1, exterior color type 2 and exterior color type 3) which is between the first threshold value (i.e., 4) and the second threshold value (i.e., 2) associated with the exterior color type characteristic.

In an embodiment, a set of one or more resources may process each set of jobs. For example, in a document production environment, a resource is a device that performs a processing function on a print job. For example, a resource may include a printer, a copier, a binder, a hole-punch, a collator, a sealer or any other equipment used to process print jobs. A set of resources may include one or more subsets of resources for processing a set of print jobs. For example, a first subset of resources may include resources necessary to process a first set of print jobs, such as a fast job set or the like.

In an embodiment, a set of resources may include an autonomous cell. An autonomous cell may refer to a group of resources used to process at least one job set. A resource may be a device configured to process one or more jobs. For example, in a document production environment, if the job requires printing, cutting and collating, an autonomous cell for processing the job may include at least one printer, one cutter and one collator. In a chemical production environment, an autonomous cell may include production resources necessary to convert a plurality or raw materials into one or more complete chemical outputs.

The quantity and type of resources that are included in each autonomous cell may be determined by utilizing simulation models that examine the workflow characteristics of the job in each set of jobs, as well as other factors such as job size, arrival time, due dates and like. Although the processing steps for a slow job set and a fast job set may be the same, for example, both assemble the corresponding trim types and add exterior paint, the characteristics of the autonomous cells may be significantly different for slow job sets and fast job sets.

In an embodiment, the job set may be routed to one or more subsets of resources. For example, a slow job set may be routed to a specific subset of resources, such as an autonomous cell, for processing. Similarly, an intermediate job set may be routed to another subset of resources for processing, while a fast job set may be routed to yet another subset of resources for processing.

Figure 6:
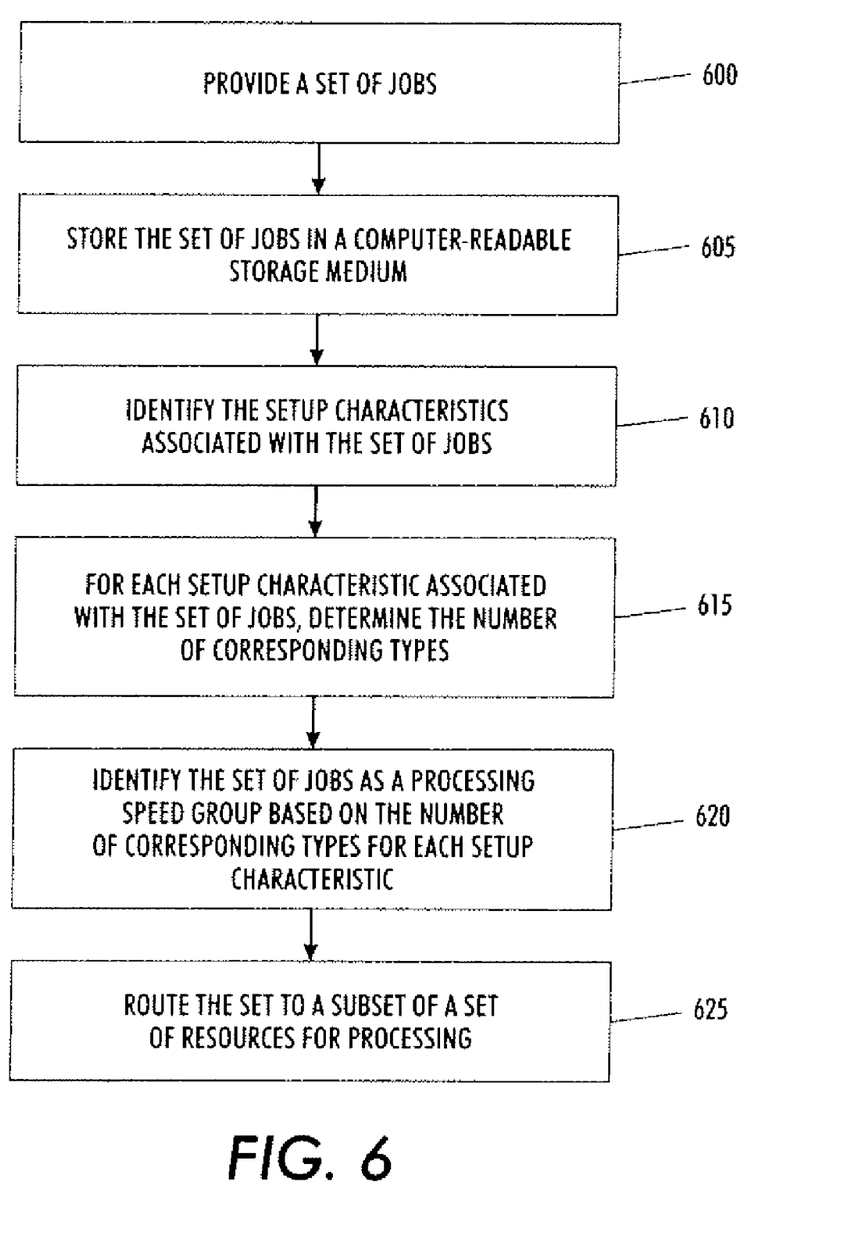
FIG. 6 depicts an exemplary flow chart of a process of partitioning a job stream according to an embodiment.

FIG. 6 illustrates an exemplary flow chart of a process of partitioning a job stream according to an embodiment. A set of jobs may be provided 600, and the set of jobs may be stored 605 in a computer-readable storage medium, such as RAM, ROM or the like. The setup characteristics associated with the plurality of jobs may be identified 610, and for each setup characteristic associated with the set of jobs, the number of corresponding types may be determined 615. A set of jobs may be identified 620 based on the number of corresponding types for each setup characteristic. The set may be routed 625 to a subset of a set of resources for processing.

Figure 7:
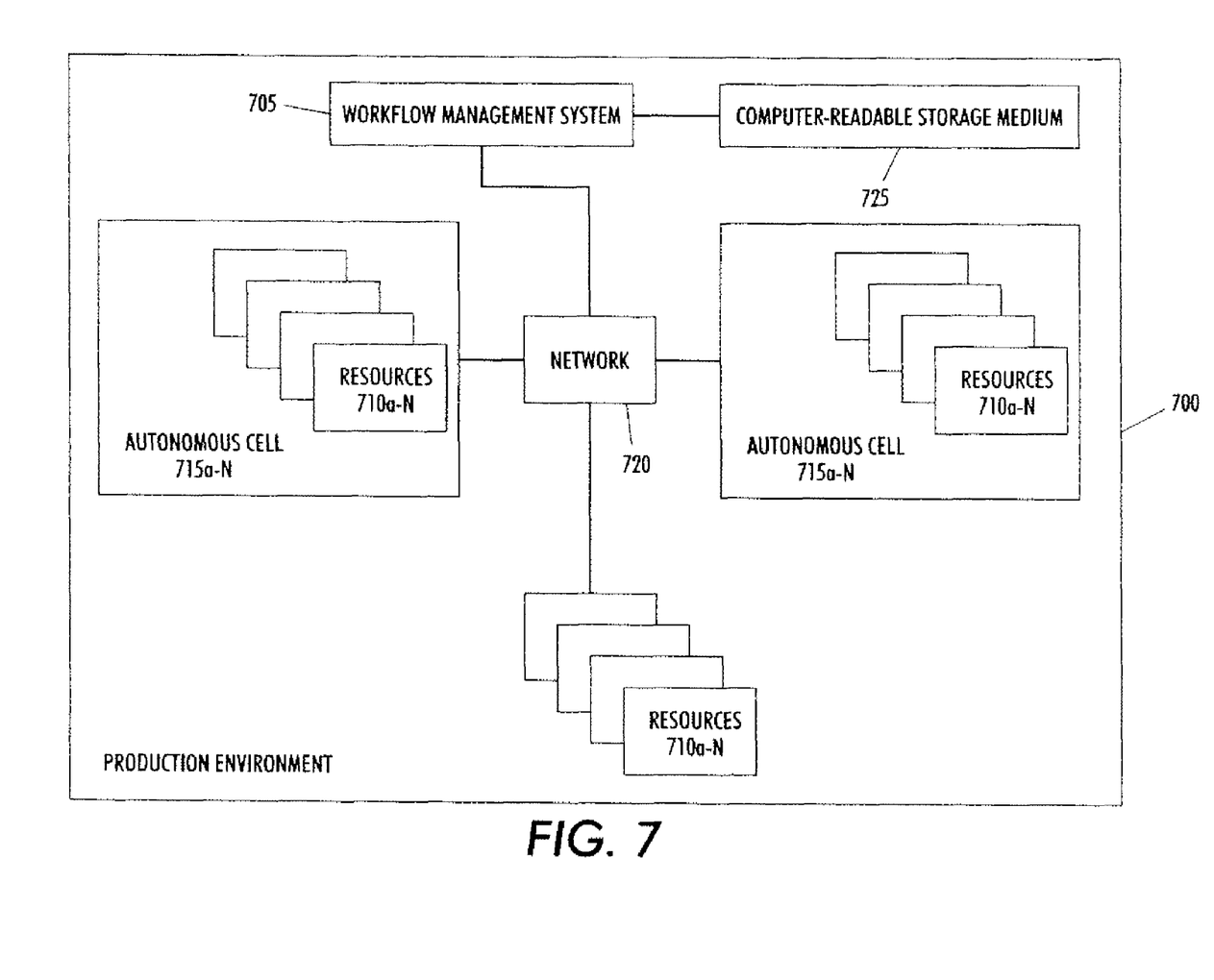
FIG. 7 depicts an environment suitable for processing a plurality of jobs according to an embodiment.

FIG. 7 depicts an exemplary environment suitable for practicing the illustrative embodiments. The production environment 700 may include a workflow management system 705 that is responsible for managing workflow in the production environment 700 and a computer-readable storage medium 725. The production environment 700 may also include resources 710a-N such as (in a document production environment) a printer, a copier, a binder, a hole-punch, a collator, a sealer or any other equipment used to process jobs. The resources may be grouped into autonomous cells 715a-N such that each autonomous cell 715a-N includes one or more resources 710a-N necessary to process at least one job. The workflow management system 705 may be implemented on a stand-alone computer system or may be integrated into the resources. The workflow management system 705 may also be implemented by distributed components such as separate electronic devices. A network 720 may interconnect the resources 710a-N with the workflow management system 705, as illustrated in FIG. 7. The network 720 may include a local area network (LAN) or a wide area network (WAN) such as the Internet or the World Wide Web. The network may also be formed by communication links that interconnect the workflow management system 705 and the resources 710a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for processing a set of jobs in a production environment, the system comprising:
    a set of one or more devices in a production environment; and
    a computer-readable storage medium comprising one or more programming instructions for performing a method of processing a set of jobs, the method comprising:
    providing a job set comprising one or more jobs, wherein each of the one or more jobs has one or more corresponding setup characteristics,
    storing the job set in a computer-readable storage medium,
    identifying the job set as one of a first job processing speed set and a second job processing speed set based on the corresponding setup characteristics
    identifying the one or more setup characteristics, wherein each corresponding setup characteristic comprises one or more types,
    for each corresponding setup characteristic, determining the number of corresponding types associated with the job set,
    determining that the job set is a first processing speed set if, for each corresponding setup characteristic, the number of corresponding types associated with the job set does not exceed a threshold value associated with the corresponding setup characteristic, and
    determining that the job set is a second processing speed set if the number of corresponding types of at least one setup characteristic associated with the job set exceeds the threshold value associated with the corresponding setup characteristic, if the job set is a first job processing speed set, routing the job set to a first subset of the set of one or more devices, wherein the first subset comprises one or more first resources for processing the job set, and
    if the job set is a second job processing speed set, routing the job set to a second subset of the set of one or more devices, wherein the second subset comprises one or more second devices for processing the job set.

2. The system of claim 1, wherein the first subset comprises a first autonomous cell and the second subset comprises a second autonomous cell.

3. The system of claim 1 further comprising:
    a workflow management system operable to coordinate a distribution of jobs to the devices.

4. The system of claim 1, further comprising one or more programming instructions for:
    determining the threshold values using a simulation method, wherein the simulation method comprises determining an optimal number of corresponding types for each corresponding setup characteristic.

5. A system for processing a set of jobs, the system comprising:
    a set of one or more devices in a production environment;
    a workflow management system operable to coordinate a distribution of jobs to the devices; and a computer-readable storage medium comprising one or more programming instructions for performing a method of processing a set of jobs, the method comprising:

providing a job set comprising one or more jobs, wherein each of the one or more jobs has one or more corresponding setup characteristics, storing the job set in a computer-readable storage medium, identifying each job set as a first job processing speed set, a second job processing speed set or a third job processing speed set based on the one or more corresponding setup characteristics by:

identifying the one or more corresponding setup characteristics, wherein each corresponding setup characteristic comprises one or more types, for each corresponding setup characteristic, determining a number of corresponding types associated with the job set, determining that the set is a first processing speed set if, for each corresponding setup characteristic, the number of corresponding types does not exceed a first threshold value associated with the corresponding setup characteristic, determining that the job set is a second processing speed group if the number of corresponding types of at least one corresponding setup characteristic associated with the job set exceeds a second threshold value associated with the corresponding setup characteristic, and determining that the job set is a third processing speed set if, for each corresponding setup characteristic, the number of corresponding types is greater than the first threshold value and less than the second threshold value, if the job set is a first job processing speed set, routing the job set to a first subset of the set of one or more devices, wherein the first subset comprises one or more first devices for processing the job set, if the job set is a second job processing speed set, routing the job set to a second subset of the set of one or more devices, wherein the second subset comprises one or more second devices for processing the job set, and if the job set is a third job processing speed set, routing the job set to a third subset of the set of one or more devices, wherein the third subset comprises one or more third devices for processing the job set.

6. The system of claim 5, wherein the first subset comprises a first autonomous cell, the second subset comprises a second autonomous cell and the third subset comprises a third autonomous cell.

7. The system of claim 5, further comprising one or more programming instructions for:

determining the threshold values using a simulation method, wherein the simulation method comprises determining an optimal number of corresponding types for each corresponding setup characteristic.

8. A computer-implemented method for processing a set of jobs, the method comprising:

providing a job set comprising one or more jobs to be processed in a production environment, wherein each of the jobs has one or more corresponding setup characteristics; storing the job set in a computer-readable storage medium;

identifying the job set as one of a first job processing speed set and a second job processing speed set based on the corresponding setup characteristics by:

identifying the one or more setup characteristics, wherein each corresponding setup characteristic comprises one or more types, for each corresponding setup characteristic, determining the number of corresponding types associated with the job set, determining that the job set is a first processing speed set if, for each corresponding setup characteristic, the number of corresponding types associated with the job set does not exceed a threshold value associated with the corresponding setup characteristic, and determining that the job set is a second processing speed set if the number of corresponding types of at least one setup characteristic associated with the job set exceeds the threshold value associated with the corresponding setup characteristic;

if the job set is a first job processing speed set, routing the job set to a first subset of the set of one or more devices, wherein the first subset comprises one or more first devices for processing the job set; and if the job set is a second job processing speed set, routing the job set to a second subset of the set of one or more devices, wherein the second subset comprises one or more second devices for processing the job set.

9. The method of claim 8, wherein the first job processing speed set comprises a fast job set and the second job processing speed set comprises a slow job set.

10. The method of claim 8, further comprising:

determining the threshold values using a simulation method, wherein the simulation method determines an optimal number of corresponding types for each corresponding setup characteristic.

* * * * *